H. S. Z. ADLER.
ROBE FOR AUTOMOBILES.
APPLICATION FILED NOV. 5, 1914.
1,164,445.  Patented Dec. 14, 1915.
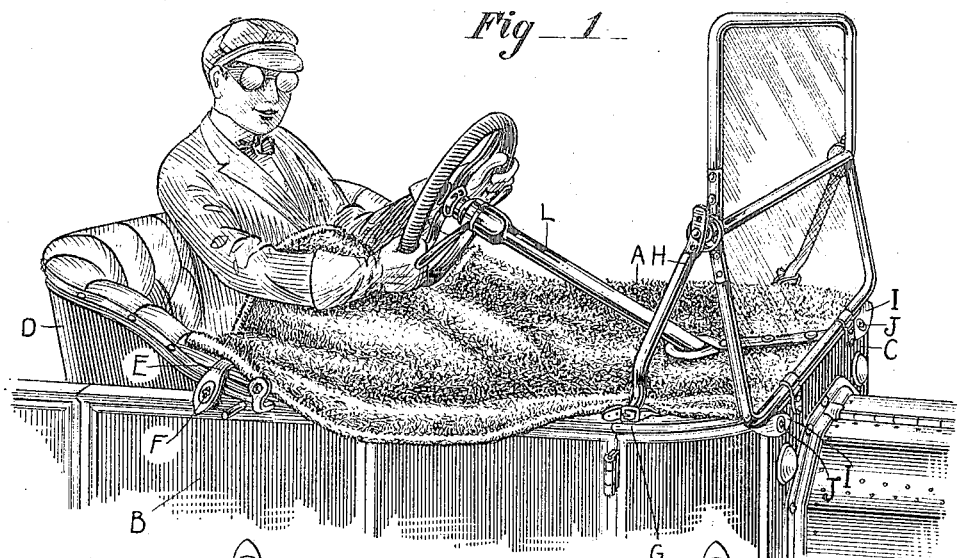
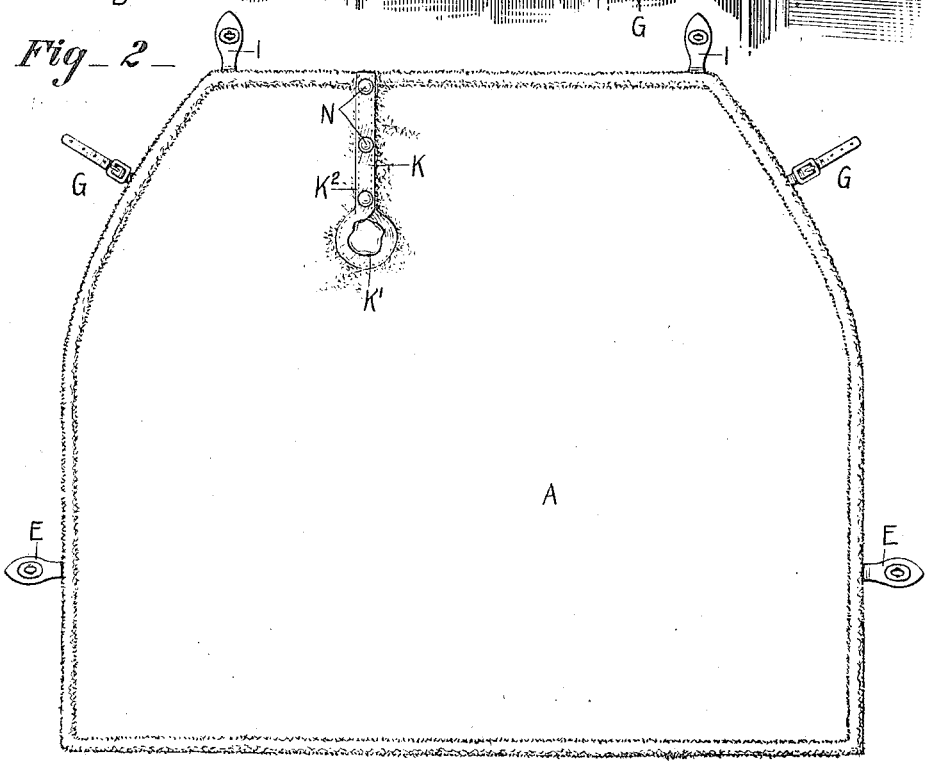
WITNESSES
Frank C. Palmer.
INVENTOR
Herman S. Z. Adler
BY Munn & Co.
ATTORNEYS

UNITED STATES PATENT OFFICE.

HERMAN S. Z. ADLER, OF NEW YORK, N. Y.

ROBE FOR AUTOMOBILES.

1,164,445.  Specification of Letters Patent.  Patented Dec. 14, 1915.

Application filed November 5, 1914. Serial No. 870,431.

*To all whom it may concern:*

Be it known that I, HERMAN S. Z. ADLER, a citizen of the United States, and a resident of the city of New York, borough of Manhattan, in the county and State of New York, have invented a new and Improved Robe for Automobiles, of which the following is a full, clear, and exact description.

The object of the invention is to provide a new and improved robe arranged for convenient attachment to an automobile to protect the lower portion of the person or persons seated on the front seat of the automobile against the inclemency of the weather, at the same time permitting the driver of the automobile to freely utilize the feet for the manipulation of the pedals and to use the hands for manipulating the steering wheel or the hand lever or levers for controlling the emergency brake, reversing mechanism, or the like.

In order to accomplish the desired result, use is made of a robe having a body shaped to extend across the open top of an automobile body from the dashboard to the front seat and from one side to the other side thereof, the front portion of the said robe body having a slit extending lengthwise from the front end of the robe body rearwardly, the rear end of the slit terminating in an opening for the passage of the steering post of the automobile, the sides of the slit and the opening being provided with a binding, the binding portions along the slit being adapted to overlap, fastening devices for fastening the said overlapping binding portions together, and fastening means on the sides and the front of the said robe body and positioned for engagement with holding devices on the automobile body.

A practical embodiment of the invention is represented in the accompanying drawings forming a part of this specification, in which similar characters of reference indicate corresponding parts in both views.

Figure 1 is a perspective view of the robe as applied to an automobile of the Ford type; and Fig. 2 is a plan view of the robe.

The robe A of a suitable material is shaped to extend across the open top of an automobile body B from the dashboard C to the front seat D and from one side of the automobile body B to the other side thereof, as plainly indicated in Fig. 1. The body of the robe A is provided at the sides near the rear end with tabs E extending outwardly and adapted to be passed over the sides of the front seat D to engage the curtain fasteners F held on the sides of the seat D, it being understood that each curtain fastener F is in the form of a turnable button adapted to engage a grommet on the corresponding tab E. The sides of the front portion of the body of the robe A are curved inwardly to conform to the shape of the front end of the automobile body B, and on the said front sides are arranged buckle straps G adapted to be buckled around the window shield braces H of the automobile body B. The front end of the robe body is provided with tabs I adapted to be engaged with curtain fasteners J arranged on the front of the dashboard C, as plainly indicated in Fig. 1, it being understood that the curtain fasteners J are similar in construction to the curtain fasteners F above mentioned. It is further understood that the curtain fasteners F and J as well as the window shield braces H form permanent parts of the automobile and are utilized for holding the robe A stretched across the open top of the body B.

The front portion of the body of the robe A is provided with a slit K extending from the front edge of the robe A a short distance inward to terminate in an opening K' for the passage of the steering post L of the automobile. The slit K and the opening K' are provided along the sides with a suitable binding $K^2$ of leather or other material, the binding portions along the slit K overlapping and provided with fastening devices N for fastening the overlapping binding portions together. When placing the robe in position on the automobile, the fastening devices N are open to allow of passing the robe by way of the slit K past the steering post L until the latter extends through the opening K' and then the fastening devices N are closed.

It will be noticed that by the arrangement described the robe A is properly supported across the open top of the automobile body B to protect the lap and lower limbs of the person or persons seated on the front seat D against the inclemency of the weather, at the same time leaving the legs of the driver completely unobstructed to permit the driver to readily manipulate the pedals in the usual manner. It will also be noticed that the driver has his hands completely free to manipulate the steering wheel or to allow the driver to reach under the robe for manipulating any one of the levers that may be in the front of the automobile body B. It is understood that the robe A is sufficiently wide to reach from side to side of the automobile body and over the lap of the person seated on the front seat D to give the desired protection to the same.

By locating the straps G to allow of buckling the same around the wind shield braces H the driver only needs to detach one of the tabs E from its fastener F whenever the driver desires to alight from the automobile body B. The corresponding rear corner of the robe can be readily folded back to allow of opening the door for the egress and ingress of the driver or other persons.

Having thus described my invention, I claim as new and desire to secure by Letters Patent:—

As an article of manufacture, an automobile robe having a body shaped to extend across the open top of an automobile body from the dashboard to the front seat and from one side of the said open top to the other side thereof, the front portion of the said robe body having a slit extending lengthwise from the front end of the robe body rearwardly, the rear end of the slit terminating in an opening for the passage of the steering post of the automobile, the sides of the slit and opening being provided with a binding, the binding portions along the slit being adapted to overlap, fastening devices for fastening the said overlapping binding portions together, the robe body being provided at the rear of its sides with projecting tabs adapted to extend over the side edges of the automobile body to engage with the curtain fastener buttons on the sides of the automobile body, buckle straps at the sides of the said robe body intermediate the ends thereof and adapted to be buckled around the wind shield braces of the automobile body, and tabs on the front end of the said robe body adjacent the sides thereof and adapted to engage the curtain fastener buttons at the front of the dashboard of the automobile.

In testimony whereof I have signed my name to this specification in the presence of two subscribing witnesses.

HERMAN S. Z. ADLER.

Witnesses:
   Theo. G. Hoster,
   Philip D. Rollhaus.